A. N. Towne.
Expanding Felloes & Tightening Spokes.
Nº 73476      Patented Jan. 21, 1868

Witnesses:
Geo. L. Chapin
A. Hayward

Inventor:
Alban N. Towne

United States Patent Office.

ALBAN N. TOWNE, OF CHICAGO, ILLINOIS.

Letters Patent No. 73,476, dated January 21, 1868.

---

IMPROVEMENT IN EXPANDING FELLOES AND TIGHTENING SPOKES.

---

The Schedule referred to in these Letters Patent and making part of the same.

---

TO ALL WHOM IT MAY CONCERN:

Be it known that I, ALBAN N. TOWNE, of Chicago, in the county of Cook, and State of Illinois, have invented a new and useful Improvement in Thimbles for Expanding Felloes and Tightening Spokes; and I do hereby declare that the following is a full, clear, and exact description of the construction and operation of the same, reference being had to the annexed drawings and letters of reference marked thereon, making a part of this specification, in which—

The nature of my invention consists in a thimble adjusted on the end of the spokes, near the felloe, so arranged as to operate in a nut sunk in the same, in order that the thimble may be turned on the spokes, so as to force the felloe outward and press it against the tire.

By this arrangement a very cheap and convenient device is provided, which will prevent the necessity of resetting the tires of wagon-wheels, which is a matter of much importance, not only as to cost, but to the condition of the wheel.

It is well known to wagon-makers and others that, at each time the tire is reset, the wheels become more dished, from the fact that the spokes remain the same length, while the felloe necessarily has to be shortened. By the use of my invention the above-named difficulty is obviated, for the felloe can be forced against the tire, causing it to fit as closely as if the tire were shrunk on.

Another advantage is gained in the durability of the wheel, for the tire can be kept tight all the time, which is not the case when the process of resetting is relied upon. Any person of ordinary skill can tighten the tire by means of the common wrench used for turning the nuts on the axles.

Figure 1:
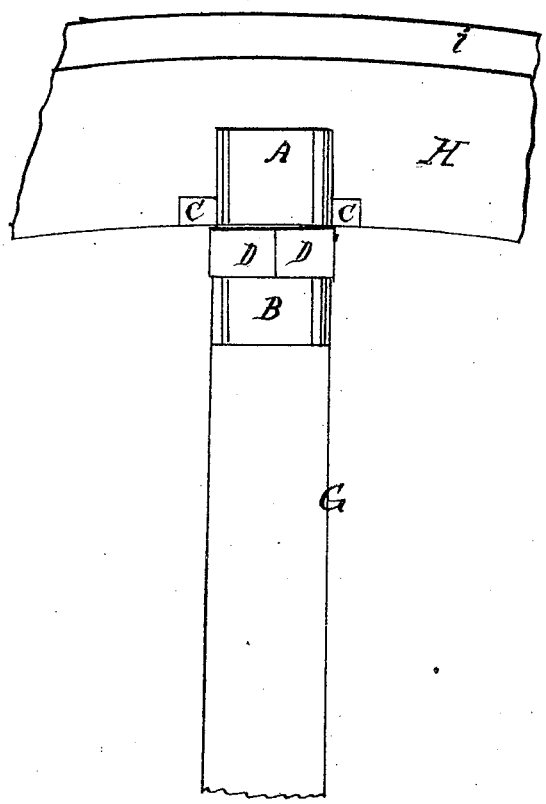
Figure 1 is an elevation of my thimble as applied to the spoke and felloe.
Figure 2:
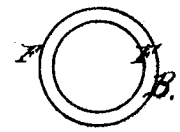
Figure 2 is an elevation of the thimble, taken at the end shown by the red line X X.
Figure 3:
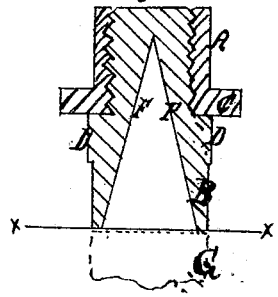
Figure 3 is a central sectional elevatiom of the same.

H represents the felloe, $i$ the tire, and G the spoke of the common wagon-wheel. B shows the thimble, having the conical opening F F for receiving the end of the spoke G. This thimble B has also the screw J, which operates in the nut A, sunk in the inner side of the felloe H. C represents lugs cast on the nut A, for the purpose of preventing the nut from turning when expanding the felloe. It will be seen at fig. 2 that the end of the thimble receives a greater portion of the spoke than is usually put in the felloe when the wheel is made on the usual plan; and further, that the conical opening F F gives the required depth for holding the spoke in position.

Operation.

A hole must be made in the felloe, at the place where each nut A is to be set, of the proper depth and size. A seat must be also made for the lugs C. The spoke G can be turned pointed to fit the conical opening F F, after which the wheel can be put together in the usual manner, and the tire can be tightened as above set forth.

I do not claim broadly the mode of expanding felloes by means of a screw on the spoke, for I am aware that the same result has been accomplished by other devices. My claim is limited to the specific device as arranged, the object being to simplify the construction and preserve the strength of the parts.

Having thus fully described my device, what I claim, and desire to secure by Letters Patent of the United States, is—

The combination of the revolving socket, having a recess to receive the spoke, and a screw chased on its external surface, and the nut, with lugs for retaining it in place, inserted into the inner face of the felloe, and having an internal screw to receive the screw in the socket, the parts being arranged to operate substantially as and for the purpose set forth.

ALBAN N. TOWNE.

Witnesses:
G. L. CHAPIN,
A. HAYWARD.